United States Patent
Beck

[11] 3,826,286
[45] July 30, 1974

[54] SPACER CONSTRUCTION FOR THERMALLY INSULATING CONCENTRIC TUBES

[75] Inventor: August Beck, Langenhagen, Germany

[73] Assignee: Kabel-und Metallwerke Gutehoffnungshutte/Aktiengesellschaft, Hannover, Germany

[22] Filed: Feb. 28, 1973

[21] Appl. No.: 336,421

[52] U.S. Cl.............................. 138/114, 138/148
[51] Int. Cl............................................. F16l 7/00
[58] Field of Search .......... 138/114, 113, 148, 149, 138/150

[56] References Cited
UNITED STATES PATENTS
| | | | |
|---|---|---|---|
| 3,326,244 | 6/1967 | Charles et al. | 138/114 |
| 3,369,826 | 2/1968 | Boosey et al. | 138/149 |
| 3,791,416 | 2/1974 | Ziemer et al. | 138/112 |

Primary Examiner—Herbert Goldstein
Attorney, Agent, or Firm—Ralf H. Siegemund

[57] ABSTRACT

In a coaxial tube system for low temperature use, such as an envelope for cryogenic cable or as conduit for low temperature fluids, the system having a first, inner tube and a second, outer tube concentric to the inner tube, there being a ring space in-between, a spacer and supporting structure in the ring space, comprising a plurality of layers on the inner tube in concentric relation thereto and to each other and in superimposed relation; each layer includes at least one highly reflective foil ribbon and of at least one supporting ribbon of like width and helically wound on the respective layer underneath on the inner tube, and in sequential loops leaving a narrow gap between adjacent loops; sequential layers have their respective ribbons wound at opposite pitch and sense of direction of winding; the ribbon helices of every other layer are superimposed and the gaps of every other layer are radially aligned so that the gaps of immediately adjacent layers intersect, resulting in a plurality of gap intersections arranged along at least two helices around the inner tube; a plurality of flexible members such as filaments, ropes, string, etc., respectively traverse the gap intersections, for holding the inner tube underneath said radially aligned gap intersections; and means, such as a helical carrier hold the said flexible means adjacent the outer tube for suspending the inner tube therein.

9 Claims, 5 Drawing Figures

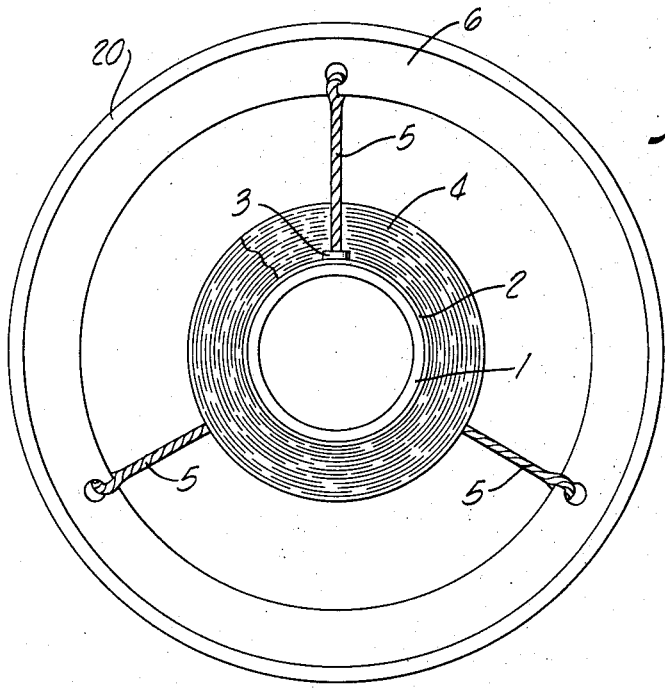
FIG. 2.
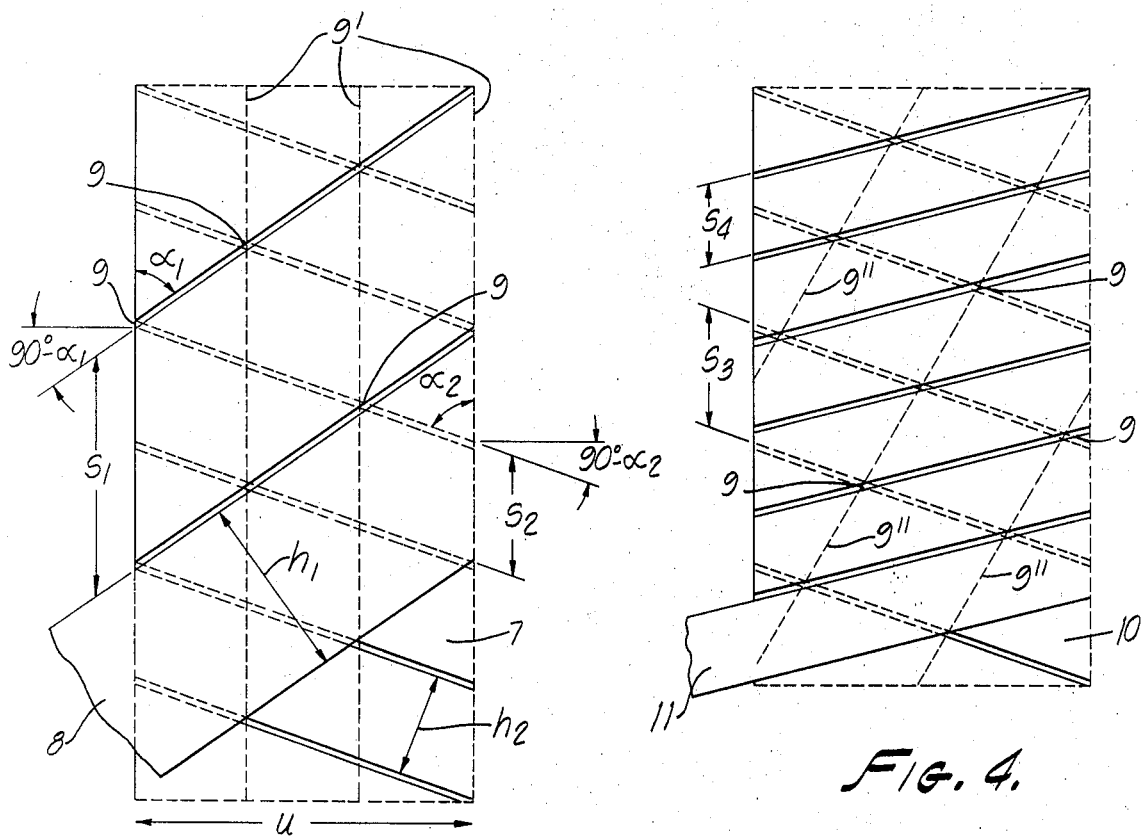
FIG. 3.
FIG. 4.

SPACER CONSTRUCTION FOR THERMALLY INSULATING CONCENTRIC TUBES

BACKGROUND OF THE INVENTION

The present invention relates to a coaxial and concentric tube system with an inner tube containing a supraconductor cable and/or low temperature fluids.

Coaxial tube systems are known which comprise corrugated metal tubes arranged in concentrical relation but being separated by spacer construction that provides for thermal insulation between the two tubes across the ring space. However, the spacer construction must also maintain the tubes in concentric relation, e.g., support the inner tube coaxial to nd in the outer tube. By way of example, the spacer construction may include laminated thermal insulation. The insulation lamina may comprise alternatingly positioned, highly reflective foils and spacer sheathing to provide mechanical stability for the arrangement. Such laminated construction was found suitable in cases and shall also be employed in practicing the invention. These lamina keeps the two tubes thermally insulated from each other in that any thermal radiation directed toward the inner tube is radially outwardly reflected.

Cryogenic cables are known in which the conductors run through a tube which is filled with a liquid helium. The tube is corrugated for various reasons and is received by one or several concentric tubes which, together, thermally insulate the liquid helium from the environment. In cases, altogether four or more coaxial and concentric tubes are used. The space between the innermost tube and the one next around it may be evacuated. The ring space between the latter the next one may be filled with liquid nitrogen to establish a definite and controlled radial temperature gradient in the system. The nitrogen is actively maintained in the liquid state. The ring space between the outermost tube and the one containing the nitrogen (as well as the other two tubes in concentric arrangement) is again evacuated. However, that ring space may additionally be provided with laminated foils as outlined above.

Tube systems are known as conduit for liquified gases, such as helium or hydrogen. Coaxial tubes in these as well as in the instances of the examples above, are maintained in coaxial and concentric position by means of particularly constructed spacers. For example, a helix is wound on the inner tube and the outer tube sits on the helix, either directly or by means of particular radially extending support elements.

Using solid spacers made of plastic provides significant thermal insulation between the tubes. However, very low temperature liquids require plural concentric tubes and a controlled temperature gradient because as solid spacers have a definite, not negligible thermal conductivity, and the heat flow does become significant when the temperature gradient between two tubes is too steep. It has to be observed that a concentric tube arrangement requires some kind of support of the inner tube in the outer tube, and that support invariably provides for some heat transfer. For this reason, actively maintaining a controlled temperature gradient through an intermediate cooling and coolant envelope (liquid nitrogen) was deemed necessary.

A significant improvement of the conditions are shown in U.S. Pat. Nos. 3,592,238 and 3,670,772, disclosing a laminated spacer. Another improvement refers to suspending the inner tube in the outer tube by means of flexible filaments (ropes or the like).

These spacer constructions, however, do not take care of the problem of thermal radiation shielding of the inner tube. The requirement of both, thermal radiation shielding and insulation against conduction, has lead to the multiple tube system with a low temperature liquid envelope in one of the intermediate ring spaces between the concentric tubes. Moreover, it was found that the known spacers which support an inner tube in an outer tube, set up gaps in the radiator shielding sufficient to increase drastically the influx of thermal radiation from outer to inner tube. Again, this drawback was deemed avoidable only by the said multiple tube construction plus low temperature insulating liquid in an intermediate ring space.

SUMMARY OF THE INVENTION

It is an object of the present invention to provide a coaxial and concentric tube system which provides further improvements in the thermal insulation between the tubes.

It is another object of the present invention to provide a coaxial and concentric tube system for a cryogenic cable or as conduit for very low temperature liquids which does not require intermediate cooling by means of, e.g., liquid nitrogen as outlined above.

It is a further object of the present invention to provide an improved spacer arrangement between two concentric tubes, the improvement relating primarily to thermal insulation as compared with the performance of prior art tube systems.

It is a further object of the invention to provide a spacer construction between two concentric tubes which serves as radiation shielding as well as low thermal conductance arrangement.

The problem, therefor, exists to provide a spacer construction for concentric tubes, wherein the ring space between them can be evacuated to obtain minimum thermal conductance. Plural reflective foils should envelope the inner tube to obtain radiation shielding. However, the inner tube must be adequately supported in the outer tube without setting up heat bridges. Only if these conditions are adequately met will it be possible to obviate the need for an intermediate cooling requiring at least four concentric tubes as outlined above.

In accordance with the preferred embodiment of the invention it is suggested to provide the following spacer as a thermally insulating and supporting structure between inner and outer tube of a coaxial and concentric tube system. The inner tube carries a plurality of layers or lamina, wherein each layer includes at least one lay of highly reflective foil ribbon and at least one support ribbon, both wound in superimposed relation and in helical configuration with a narrow gap between (axially) adjacent loops. The ribbons of adjacent layers have different sense of pitch so that the respective gaps intersect and the intersecting gaps form a plurality of radially extending passages; the passages appear arranged on and along at least two helices corresponding to the two helices established by the ribbons in adjacent layers or lamina. The passages receive elongated, flexible members for suspending the inner tube concentric to and within the outer tube.

As a consequence of this arrangement, only a very small portion of the inner tube is not covered by layering, namely the portions underneath aligned gap intersections. Each such passageway has to be only as wide as the flexible suspension member passing through. That member per se, and as passing through the passageway, is quite instrumental in reducing any thermal radiation through the respective passageway of the aligned gap intersection at that location.

The ribbons which are wound at different pitch should differ in width to establish three or more such gap intersections along one loop of, e.g., the gap helix with the smaller pitch. This establishes an azimuth angle between adjacent suspension points of 120° or less which is of advantage for suspension stability.

The invention is preferably realized in that a single layer in each layer is established by one foil ribbon plus one radially superimposed spacer ribbon wound in a helix with a slight gap between adjacent loops. However, one could use two intertwined helices thereby doubling the number of gap intersections. Using that same principle also for ribbons that are wound with the opposite sense of pitch quadruples the number of intersections.

The suspension system itself may comprise a helical strip on the inner tube with fasteners arranged along the helix for holding one respective end of the flexible members. The respective other end of each flexible member is affixed to carrier and holding means along the inner surface wall of the outer tube. During the winding of the ribbons onto the inner tube, the flexible suspension members are preferably received by stiff sleeves serving as indexing elements in relation to which the gap intersections are established. These sleeves are later removed as they would constitute radial thermal bridges.

The foil ribbons are preferably made of highly reflective aluminum and are carried on a plastic or woven fabric type carrier ribbon so that they can be wound in unison. Each layer of uniform sense of pitch can comprise of one lay of such helically wound ribbon. However, multiple lays of the same pitch can be wound or the ribbons may be wound in bundles of multiple, superimposed ribbons to establish a layer.

The flexible elongated holding members are preferably threads, strings or ropes, made of plastic of the type known under the tradenames Diolen, Trevira, Perlon or the like.

The tubes are preferably made of metal and are corrugated to obtain a flexible tube system.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a cross section through a completed assembly comprised of inner and outer tubes and spacer construction in accordance with the preferred embodiment of the invention;

FIGS. 3 and 4 are geometric developments of layer structure as resulting from superimposedly winding differently wide ribbons, one on top of the other, but at oppositely oriented pitch; and FIG. 5 illustrates in isometric view the spacer assembly.

Figure 1:
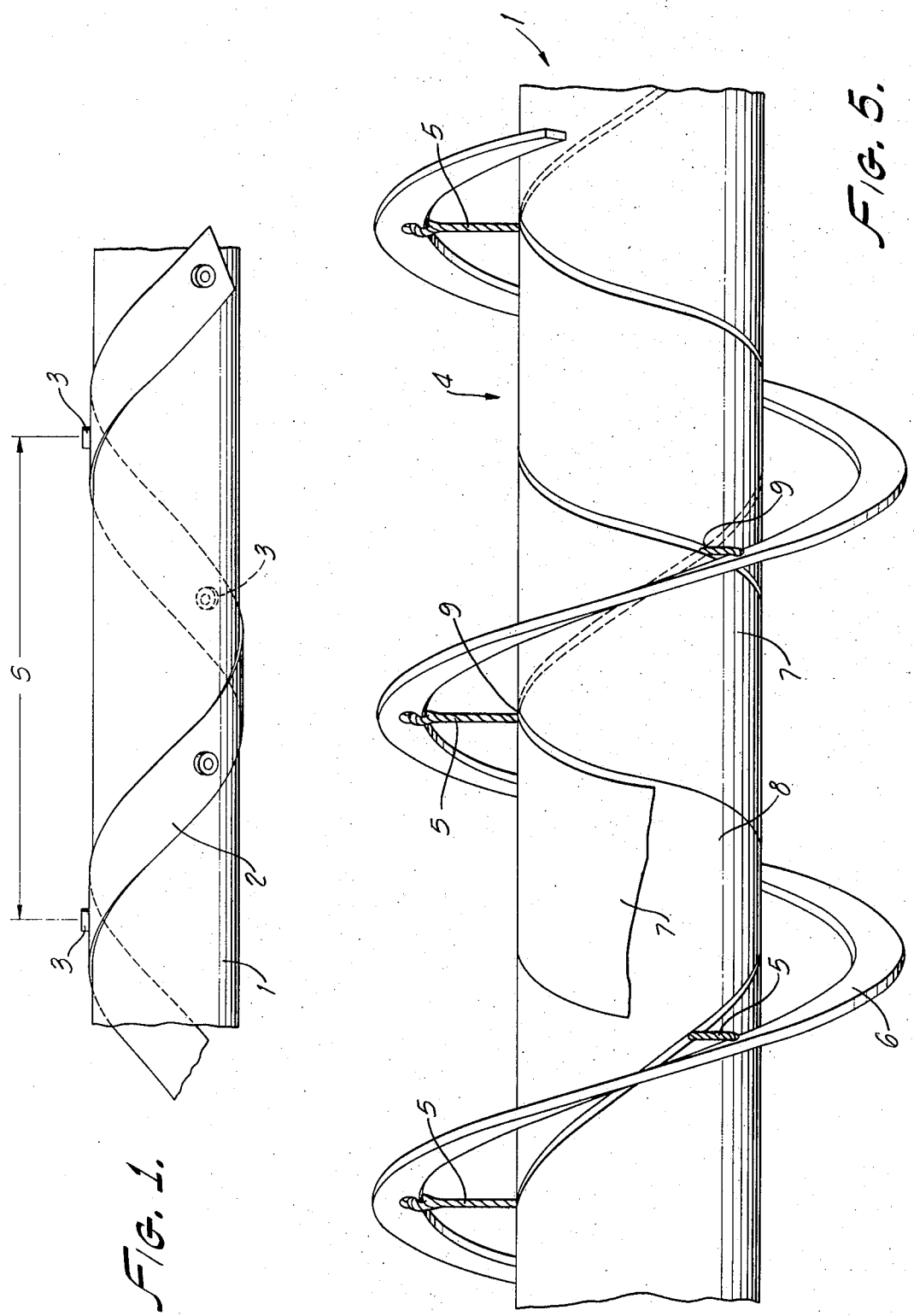
FIG. 1 is a side view of a portion of an inner tube prepared with a helical strip that establishes suspension points.

Proceeding now to the detailed description of the drawings, the cross section through a concentric tube system as shown in FIG. 2 is shown to have an inner tube 1, preferably made of metal and having, e.g., annular or helical corrugation. In addition, there is an outer tube 20 arranged concentric to and about tube 1. Tube 20 may likewise be corrugated. There is a spacer and thermal insulation construction provided in the ring space between the two tubes for thermally insulating the inner tube from any influx of conductive as well as radiation heat from the outer tube, while suspending inner tube 1 concentrically to outer tube 20. The interior of tube 1 is to serve as envelope for a superconductor cable and/or as conduit for a low temperature fluid.

As stated above, the inner tube 1 is suspended in the outer tube by means of elongated, flexible members 5, such as filaments, ropes or the like. These members 5 may be made of polyester yarn or thread as used in synthetic fabric. Members 5 extend from a helix 6, contained in tube 20 or on which the tube 20 rests, so as to suspend tube 1 concentrically to helical carrier 6 and concentric suspension in tube 20 is provided therewith. Additionally, tube 1 is covered by a laminated envelope 4, comprised of a lays and layers of helically wrapped ribbons. If wrapped in bundles, each bundle has alternating reflective foil ribbon and plastic spacer ribbon, whereby the several bundles are wound on the tube at alternating right hand and left hand pitch. The flexible suspension members 5 traverse these layers because gaps, adjacent the edges of different bundles, intersect leaving local, radially extending passageways through the laminated structure 4, and these passageways receive members 5.

The assembly is arrived at and constructed as follows. Beginning with tube 1 which may have straight and smooth wall but is preferably corrugated, a particular metal strip 2 is helically wound on the tube. Strip 2 is provided with holders 3 for fastening the ends of members 5 thereto. It can readily be seen that the pitch S of that helix determines the spacing and distribution density of these fastening points (3); these fastening points are helically distributed on the tube 1 accordingly.

In the illustrated example, it is assumed that three suspension points are established for one complete loop of strip 2 (axially extending for pitch length S). Therefor, any three sequential suspension points are azimuthally spaced by 120° with reference to the axis of tube 1.

Next, filaments or ropes 5 are fastened to these holders 3 and are preferably maintained in radial outward position using tooling that interfers as little as possible with the next ensuring operation. The strip 2 may be provided with apertures or eyes as holders for fastening the filaments or ropes 5. For example, short sleeves or rings can be soldered, welded or otherwise bonded to strip 2 and the filaments are passed through and anchored on the strip 2. In order to avoid interference, one can provide a stiff long sleeve through which the respective filament 5 runs during the next ensuring winding and wrapping process. These sleeves are pulled later on. Such sleeves will serve as indexing elements in the wrapping process that establishes laminated structure 4 with particular "holes" of controlled width and location as passageways for the members 5.

As stated, the tube 1 is next to be provided with the lamina 4, using ribbons or bundles of ribbons made of reflective foil with mechanically strong ribbons separating the foils in bundle. These bundles are to be placed on the tube so that the filaments 5 pass through the resulting layer. How this is accomplished will be described next.

Turning now to FIG. 3, there is shown a first example of layering tube 1; specifically, the Figure is a development of the surface of tube 1 with two illustrated ribbon layers thereon, also shown in development. Points along the vertical left-hand side line are identical with the points along the vertical right-hand side line in the Figure, which is due to the fact that the drawing is a projection of the cylindrical surface of a tube length into a plane.

In the following, it is presumed that each ribbon bundle consists of only one foil ribbon and one carrier ribbon of like width. Reference numeral 7 refers to a ribbon which consists of an aluminum foil on a carrier ribbon made of, e.g., woven fabric or the like. The carrier ribbon is provided as an element that lends structurally stability to the laminated configuration to be established as a whole. The aluminum foil thereon may be the result of metallization and may not have much individual strength. Its primary function is to offer a highly reflective surface to any incoming radiation.

Ribbon 7 has widths $S_2 - \Delta s$, wherein $\Delta s$ refers to the rather narrow gap between adjacent loops, and $S_2$ is the pitch length of that helical ribbon. In other words, the ribbon is wound so that adjacent loops leave a rather narrow gap of width $\Delta s$. That width is about 0.5 to 4 mm wide, preferably it is about 1 mm wide or thereabouts.

Another layer or lamina is shown as being wound on tape 7, and that layer is established by a single layer of a wider ribbon 8 with correspondingly larger pitch $S_1$. Ribbon 8 has otherwise the same structure as ribbon 8, it is an aluminum foil on a fabric ribbon.

In view of the fact that a gap remains between adjacent loops of each ribbon, gap intersections 9 are defined. The illustrated portion shows three loops of ribbon 8 and six loops of ribbon 7. Consequently, the tube length illustrated has nine intersections 9 which can be used for passing through the filaments 5 (FIG. 2).

If the numbers of loops of the two differently wide ribbons per unit length are related so that their ratio is an integer, then the intersections are arranged in groups along straight axial lines such as 9'. The illustrated example shows four such lines, spaced from each other by azimuth angles of 120°. However, the drawing is a development so that the left-most and the right-most lines are identical. The arrangement of these intersections 9 along the three axis-parallel lines reflects the fact that the suspension points for tube 1 are arranged, corresponding to a series of three-point azimuthal suspensions of the inner tube in the outer tube.

On the other hand, it has to be observed that the several intersections 9 are arranged along two different helices. One helix follows or is identical with the gap helix of ribbon 7, the other helix follows and is identical with the gap helix of ribbon 8. The intersection can, therefor, be said to be arranged on and along either helix.

Considering the geometry from a somewhat different point of view, the following can be said. The number of suspension points needed may be a given parameter because of mechanical load factors. The pitch angle for the resulting helix (of strip 2) is then given by the formula:

$$\alpha_1 = \text{arc tan } (U/S) = \tan^{-1} (U/S)$$

(1)

wherein $S$ is the pitch length of strip 2 and $U$ is the diameter of the tube 1. The length of one loop of the ribbon, e.g., 8, following that helix is given by $$l_1 = \sqrt{S_1^2 + U^2} \qquad S_1 = S$$

(2)

The width (plus gap) $h_1$ of the ribbon is then $$h_1 = S_1 \cdot \text{Sin } \alpha_1$$

(3)

The actual ribbon width is reduced by one-half to 4 millimeters, preferably by 1 to 2 mm in order to ensure a sufficiently wide hole or passageway for the suspension strings 5.

Assuming that the narrower ribbon 7 requires two loops for one loop of the wider ribbon per unit length, then the pitch angle of the narrower ribbon is $$\alpha_2 = \text{arc tan } (2\ U/S_1) = \tan^{-1} (2U/S_1) = \tan^{-1} (U/S_2)$$

and its length is $$l_2 = \sqrt{(S_1/2)^2 + U^2}$$

(5)

The width of the narrow ribbon (plus gap) is $$h_2 = (S_1/2) \cdot \text{Sin } \alpha_2 = S_2 \cdot \text{Sin } \alpha_2$$

(6)

It can, thus, be seen that upon winding two ribbons having widths $h_1$ and $h_2$ as defined onto the tube, whereby ribbon 7 is wound so that its edges are tangent to the fastening points 3, and upon winding ribbon 8 in relation thereto as expressed in the formulas above, alternate layers are produced differing in sense of winding, and leaving uncovered only spots 9 in radial alignment with fastening points 3 and the thread members 5 or the like (possibly in indexing sleeves) traverse the resulting passageways as built up when layer is placed upon layer.

Of course, it has to be observed that diameter $U$ is not constant, but increases from layer to layer in small increments. The number of layers to be established is, however, so large that the diameter increase cannot be neglected. As a consequence, the pitch angle changes and the ribbon width must increase accordingly, otherwise the "hole" would become larger and larger.

An alternative winding scheme is shown in FIG. 4. A narrower ribbon 11 is wound at pitch $S_4$ on top of a somewhat wide ribbon 10 having been wound onto tube 1 at pitch $S_3$. In this particular instance an (arbitrarily chosen) unit length of the tube carries five loops of the wider ribbon 10 but seven loops of the somewhat narrower ribbon 11. The numbers five and seven do not yield an integral ratio. The intersections 9 in this case are not arranged along straight axial lines, but they are helical lines 9'', having relatively large pitch. They are, in effect, arranged on a third helix in this case.

The number of suspension points for one loop of the wide ribbon and along its almost adjoining edges varies between two and three and is, therefor, not as mechanically secure as the resulting suspension of FIG. 3. One can readily see that the pitch length of the wider ribbon should be more than twice the pitch length of the narrower ribbon to obtain sequential suspension points at less than 120° azimuthal spacing.

It can, thus, be seen that relationship of the pitches of the two helices determines the geometrical relation among these intersections 9 of the gaps in each layer. These intersections are available as points of radial traversal for the suspension filaments 5. Of course, FIGS. 3 and 4 show just two layers or strata, but it can readily be seen that in FIG. 3 another narrow ribbon 7 should be wound on top of ribbon 8 and in direct radial alignment with the first layer of ribbon 7. And again, another ribbon 8 is wound on top and in exactly the same manner as the illustrated one. This way, a laminated layer 4 can be constructed by alternating between ribbon 7 and 8 and by chosing the appropriate pitch in each instance. The radial outwardly extending flexible members 5, as inserted temporarily in thin tubes or sleeves, serve as indexing points as an intersection 9 must be established as between the gaps in each two successive layers, but the location of these intersections is maintained throughout as far as radial position is concerned to gradually build up a passageway from the respective suspension filament.

It can readily be seen that the ribbon widths and the resulting pitches must be selected, so that the intersections 9 arrange along two helical lines and one of them must coincide with the helix of the suspension points 3 (FIG. 1). The general rules should be developed here with some particularity, particularly because there is no inherent necessity to have the fastening points arranged in a helix; that is merely a convenient way of arranging them on tube 1 as shown in FIG. 1.

It is of importance for practicing the invention to realize the relation between respective widths of the several ribbons. First of all, width and pitch can almost be used interchangeably, as the difference between them is the gap between adjacent loops and that gap width is determined on basis of space needed to pass the filaments through at the intersections. The gap may be about 0.5 to 2 mm. There is some degree of choice available here, but the gaps should not be too large.

If, for example, two ribbons of equal width are used and upon winding them at alternating pitch onto the tube, then the intersections are arranged along two straight lines that run axis-parallel and face each other across the diameter, i.e., they are displaced by 180° relative to each other. Suspension is not too well defined in this instance.

If one ribbon is about twice as wide as the other, and the pitch lengths are related by 2 : 1, then a length of the tube covered by one loop of one ribbon and by two loops of the other one, has three intersections, and they are arranged along the edge helix of the wider ribbon, but one can also say that each of these three intersections pertains to a group of intersections which are arranged on an axis-parallel line. There are three such lines accordingly, azimuthally spaced by 120°. This was shown in FIG. 3.

In developing this concept further, one will realize that, in fact, (1) the number of intersections on a length of tubing, is equal to the sum of loops of the two ribbons on that length, and (2) by necessity, these intersections are arranged along two helical lines, one line following the almost adjoining edges of one ribbon, the other line following the analogous gap between adjacent loops of the other ribbon.

Additionally, it is repeated that in case these loop members have integral ratio (larger loop number over smaller loop number being an integer), then the intersections are arranged along straight axis-parallel lines; otherwise the intersections are arranged in several intertwined helices of very large pitch.

As far as the particular example is concerned, these general rules apply as follows: The strip 2 is wound onto tube 1 in a particular pitch and the fastening points 3 are provided on strip 2 in particular distance along the resulting helix. If tube 1 is corrugated, any helical corrugation will have much smaller pitch. Also, sense and direction of pitch should be different from the helix of strip 2. The two ribbons used to establish the multiple layer are now selected as follows: A first ribbon is wound at the same pitch as strip 2, and its width is selected accordingly. The second ribbon has such a width that it crosses the strip 2 in-between at an angle to fit snugly between two consecutive holders 3, while the width (plus gap) of that second ribbon equals its pitch, so that the next loop will be on the other side of one of the holders and so forth.

After the different foil-plus-carrier ribbons have been wound onto the two in alternating layers and alternating in sense and direction of winding, the laminated structure 4 has been provided.

FIG. 5 can be interpreted as the last phase, wherein a narrower foil-plus-fabric ribbon 7 is wound in a last layer onto a layer underneath established by a wider foil-plus-fabric ribbon 8. Ropes or filaments 5 project radially from the intersections 9 and are suspended from the helical carrier 6.

Carrier 6 has preferably the same helical pitch as strip 2. Carrier 6 is made of metal or plastic. The filaments or strings 5 have been cut to appropriate lengths and are fastened, for example, in openings on carrier 6. Strings 5 may be provided with hooks, eyes or the like to obtain the suspension from carrier 6.

The outer tube 20 may then be formed onto the structure shown in FIG. 5. For example, metal strip is longitudinally paid along tube 1 tangent to an axis-parallel line along, but above the outer edge of carrier 6. That strip is folded around the axis to obtain a split tube that is coaxial to tube 1. The now adjoining longitudinal edges of that strip are welded and the resulting tube is finally corrugated so that the cylinder that is tangent to the resulting inwardly directed corrugation crests coincides with the cylinder that is tangent to the outer edge of carrier 6. The corrugation can be annular or helical but in the latter case the pitch sense is preferably opposite to that of helix 6. The resulting corrugated tube 20 may additionally be covered with protective envelopes such as an outer plastic lining or the like, as is known per se. Additional concentric tubing is not necessary.

It can, thus, be seen that the resulting tube structure is suspended from a carrier such as 6 as abutting the inner wall surface of the outer tube, and additional foil-plus-fabric layers in alternating configuration cover tube 1, but do not extend through the entire ring space between tubes 1 and 20. The ring space should be evacuated and the outermost layer (of ribbon 7) of the wrapping 4 should be highly reflective. This configuration protects the inner tube against heat radiation emanating from tube 20 and from the carrier 6. The wrapping has a few "holes" (9), each being less than half of one-tenths of a square centimeter wide, but little radiation can pass through because the hole is to a considerable extent occupied by a filament or rope 5.

By way of example, the inner tube 1 may have outer diameter of 100 mm. A section of that tube of 1 meter has surface of 3,140 cm². If there are 15 suspension points and holes in that section, then the total "hole area" is in the order of 1 cm², which is less than 1/10 of 1 percent. In addition, one may want to consider that a two gap area along each ribbon has only half of the layer thickness, because of the gap between adjacent loops. This may cover an area of a few percent, and is also of negligible consequence. It is important that the laminated structure 4 is not interrupted by a helical or by a ring-shaped support spacer. In that instance, the exposed surface of tube 1 would be more than one order of magnitude higher.

In lieu of helix 6, one could use a cage structure with rings for suspending tube 1 plus lamina 4 in tube 20. Suspension rings are, for example, disclosed in copending application, Ser. No. 261,047 filed June 8, 1972, now U.S. Pat. No. 3,791,416, by me and others. In either case, the outside of tube 20 can now readily be exposed to normal room or ambient temperature, while the interior of tube 1 holds liquid at cryogenic temperatures.

The invention is not limited to the embodiments described above but all changes and modifications thereof not constituting departures from the spirit and scope of the invention are intended to be included.

I claim:

1. In a coaxial tube system for low temperature use, such as an envelope for cryogenic cable or as conduit for low temperature fluids, the system having a first, inner tube and a second, outer tube concentric to the inner tube, there being a ring space in-between, a spacer and supporting structure in the ring space, comprising:
   a plurality of layers on the inner tube in concentric relation thereto and to each other and in superimposed relation;
   each layer comprised of at least one highly reflective foil ribbon and of at least one supporting ribbon of like width and helically wound on the respective layer underneath on the inner tube, and in sequential loops leaving a narrow gap between adjacent loops;
   sequential layers have their respective ribbons wound at opposite pitch and sense of direction of winding; the ribbon helices of every other layer being superimposed, the gaps of every other layer being radially aligned and the gaps of immediately adjacent layers intersecting, resulting in a plurality of gap intersections arranged along at least two helices around the inner tube;
   a plurality of flexible members such as filaments, ropes, string etc., respectively traversing the gap intersections, for holding the inner tube underneath said radially aligned gap intersections; and
   means for holding the said flexible means adjacent the outer tube for suspending the inner tube therein.

2. Spacer and supporting structure as in claim 1, the gaps being approximately as wide as the said flexible members are thick.

3. Spacer and supporting structure as in claim 1, wherein the ribbons used for one of said layers have width different from the ribbons in the respective two adjacent layers.

4. Spacer and supporting structure as in claim 1, said flexible members having their ends affixed to the inner tube.

5. Spacer and supporting structure as in claim 4, a plurality of holders on the inner tube arranged in radial alignment with said gap intersections for holding the flexible members.

6. Spacer and supporting structure as in claim 5, said holders arranged on a strip wound helically on the inner tube.

7. Spacer and supporting structure as in claim 1, the ribbons of the same sense of pitch and used in outer layers being wider than ribbons used in inner layers on the inner tube.

8. Spacer and supporting structure as in claim 1, said means for holding including at least one member inserted in the outer tube, seated therein and suspending said inner tube by said flexible members.

9. Spacer and supporting structure as in claim 8, said member being a helical carrier following a helix of the gap intersections.

* * * * *

UNITED STATES PATENT OFFICE
CERTIFICATE OF CORRECTION

Patent No. 3,826,286            Dated July 30, 1974

Inventor(s) August Beck

It is certified that error appears in the above-identified patent and that said Letters Patent are hereby corrected as shown below:

On the cover sheet insert:

-- [30] Foreign Application Priority Data

March 3, 1972      Germany      P 22 10 173.1    --.

Signed and sealed this 14th day of January 1975.

(SEAL)
Attest:

McCOY M. GIBSON JR.          C. MARSHALL DANN
Attesting Officer              Commissioner of Patents